United States Patent
Smith et al.

(10) Patent No.: US 8,463,730 B1
(45) Date of Patent: Jun. 11, 2013

(54) RAPID EVALUATION OF NUMERICALLY LARGE COMPLEX RULES GOVERNING NETWORK AND APPLICATION TRANSACTIONS

(75) Inventors: Paul Smith, Los Altos, CA (US); Rick Giles, San Jose, CA (US); Tony Sun, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 894 days.

(21) Appl. No.: 12/605,287

(22) Filed: Oct. 23, 2009

Related U.S. Application Data

(60) Provisional application No. 61/108,478, filed on Oct. 24, 2008.

(51) Int. Cl.
*G06F 17/00* (2006.01)
*G06F 17/30* (2006.01)

(52) U.S. Cl.
USPC .................................. 706/48; 726/2; 726/26

(58) Field of Classification Search
None
See application file for complete search history.

(56) References Cited

U.S. PATENT DOCUMENTS

| | | | |
|---|---|---|---|
| 6,430,183 B1 | 8/2002 | Satran et al. | |
| 7,215,637 B1 | 5/2007 | Ferguson et al. | |
| 7,986,629 B1 | 7/2011 | Ferguson et al. | |
| 2003/0172292 A1 | 9/2003 | Judge | |
| 2004/0107360 A1 | 6/2004 | Herrmann et al. | |
| 2005/0193429 A1 | 9/2005 | Demopoulos et al. | |
| 2005/0251510 A1* | 11/2005 | Billingsley et al. | 707/3 |
| 2007/0061433 A1 | 3/2007 | Reynolds | |
| 2007/0094265 A1 | 4/2007 | Korkus | |
| 2007/0157286 A1 | 7/2007 | Singh et al. | |
| 2007/0174905 A1* | 7/2007 | Martherus et al. | 726/8 |
| 2011/0264822 A1 | 10/2011 | Ferguson et al. | |

OTHER PUBLICATIONS

U.S. Appl. No. 12/605,278, specification, claims and drawings as filed Oct. 23, 2009.
U.S. Appl. No. 12/605,262, specification, claims and drawings as filed Oct. 23, 2009.
U.S. Appl. No. 12/605,268, specification, claims and drawings as filed Oct. 23, 2009.
Final Rejection for U.S. Appl. No. 12/605,268, mailed Aug. 14, 2012.
Final Rejection for U.S. Appl. No. 12/605,278, mailed Aug. 30, 2012.

\* cited by examiner

*Primary Examiner* — Alan Chen

(57) ABSTRACT

A solution for rapid evaluation of numerically large complex rules governing network and application transactions includes, at a network device, receiving network transaction record comprising a plurality of elements that characterize a network transaction, creating a hash of a result of concatenating the plurality of elements, and if the hash is found in a hash table comprising, for each network transaction rule, a hash of the plurality of elements comprising the rule, blocking the network transaction or alerting a network user that a prohibited transaction has occurred.

18 Claims, 12 Drawing Sheets

File transaction concatenation:

"192.1.1.10168.10.0.1foo.doc/foo/bar open"

Database transaction concatentation:

"192.1.1.10168.71.2.21SelectHRPayroll"

Concatenation of rules:

General Rule: "192.1.1.10168.71.2.21"

File Rule: "192.1.1.10168.10.0.1foo.doc"

Database Rule: "192.1.1.10168.71.2.21HRPayroll"

FIG. 5

| Loaded Rules | Client IP | Host IP | File | Path | Operation | Database | Table |
|---|---|---|---|---|---|---|---|
| | 192.1.1.1 | 168.71.2.21 | | | Select | | Payroll |
| | 158.21.5.1 | | | | Delete | | |

- Only 4 Elements Specified By The 2 Loaded Rules
- Maximum Hash Combinations = $2^4 - 1 = 15$

FIG. 8

RAPID EVALUATION OF NUMERICALLY LARGE COMPLEX RULES GOVERNING NETWORK AND APPLICATION TRANSACTIONS

CROSS REFERENCE TO RELATED APPLICATIONS

This application claims the benefit of provisional patent application No. 61/108,478 filed Oct. 24, 2008, entitled "Systems and Methods for Network Traffic Processing," the disclosure of which is incorporated herein in its entirety by reference.

This application is related to the following commonly assigned applications:

- patent application Ser. No. 12/605,278 filed Oct. 23, 2009, entitled "Dynamic Packet Filtering";
- patent application Ser. No. 12/605,262 filed Oct. 23, 2009, entitled "Association of Network Traffic to Enterprise Users in a Terminal Services Environment"; and
- patent application Ser. No. 12/605,268 filed Oct. 23, 2009, entitled "Network Rule Builder".

FIELD OF THE INVENTION

The present invention relates to the field of computer science. More particularly, the present invention relates to rapid evaluation of numerically large complex rules governing network and application transactions.

BACKGROUND OF THE INVENTION

As networks continue to grow in speed and complexity, the owners of these networks have an increasing need to understand and control the activity of the users of these networks. Businesses maintain large and complex internal networks that interconnect their employees and contractors and allow those individuals to access critical business information stored on servers within the business. Those same individuals also access the Internet through the business's internal network.

The need to understand and control activity of these users as they access information is driven by two business requirements. One is regulatory compliance—government and industry regulations require companies to control the behaviors of employees and contractors as they access financial information, health care records, customer's credit card data and other information. A second driver is the general need for internal security controls to prevent employees from abusing access to information. This abuse can result in theft of intellectual property, fraud, inappropriate use of critical information such as a company's unpublished financial results, and many other abuses.

Controlling the network behavior of users is made difficult by two factors. First, the number of different applications in use on the network has exploded. Many Fortune 500 companies report that there are thousands of different applications in use on their networks. Each of these applications has its own data formats and communications formats. As users examine and manipulate information on a company's servers using these applications, they generate a large number of "transactions" on the internal network. The format of these transactions and the operations performed also vary widely from application to application.

A second factor that makes control of user activity difficult is the high speed of internal transactions. The speed of internal networks can easily be several orders of magnitude faster than the edge networking speeds that connect the enterprise to the Internet. In addition, the internal network speeds continue to increase. The speed with which transactions are occurring on a company's network is exploding.

To control transactions on a company's network, the company has to translate its policies around insider/employee behavior and around regulatory compliance issues into a set of rules that control the transactions that users in various different roles are allowed to perform. These rules then need to be used to program some sort of control system that can read all of the thousands of different transactions occurring on the network and somehow apply rules to all of this traffic. The speed of the traffic and diverse nature of the transaction data makes this extremely challenging.

Rule systems typically include a "rule engine" that constantly evaluates incoming transactions against a list of rules. The list of rules is usually very long and complex, and because the transaction rate is so high, the time available to evaluate each rule gets shorter and shorter. In most rule systems, the evaluation process is to compare each transaction to every rule that is loaded. As the number of rules increases, the rule engine will run slower and slower.

The above problem is made even worse because the number of items of information in each transaction is diverse. For example, if a user accesses a file sharing system, the transaction will contain the file name, the file folder or path, the file size and many elements. These elements can have different data types; some are integers, some are fixed length strings, some are variable lengths strings, and some are binary data. This further complicates the task of the rule engine.

Shown below is how a typical rule engine might specify a rule:

IF Group(Marketing) performs READ on ANY file in path in subdirectory //users/spreadsheets on host FINANCE THEN alert This rules says that people in the Marketing group may not read files stored on the FINANCE server and that are stored there in the //users/spreadsheets subdirectory. A company could easily have thousands or tens of thousands of such rules in place. And as the number of rules increases, the time to evaluate all of them for each transaction will grow. But this is the opposite of the desired result because in many cases the company wants to enforce the rules—that is, actually block the transaction before it completes. But if the rule engine takes a very long time to evaluate each transaction, that rule engine is unlikely to have finished its evaluation in time to stop the transaction. And even if the rule engine is fast enough to initially stop the transaction, there is no guarantee that it will be able to do so in the future as new rules are added because these new rules will slow down the rule engine.

Accordingly, a need exists in the art for a rule engine having the ability to evaluate a wide variety of different transaction types each containing a wide variety of elements that have many different data types. A further need exists for such a solution that has the ability to compare a transaction against a very large number of rules in a very short period of time (less than a millisecond), and have that evaluation time remain fixed regardless of the number of rules loaded.

SUMMARY OF THE INVENTION

Embodiments of the present invention provide a rule engine that can examine a complex set of varied transactions that have elements of many different types and further can determine if a transaction matches all of the elements of all of the loaded rules. These operations can be completed in a bounded time period that is very short and which is not a function of the number of rules that are loaded.

According to one embodiment of the present invention, a rule engine receives transactions from a decoding engine and compares them to a set of rules stored in a rules store. These rules are stored in a rules hash table which is constructed using a "concatenation and hashing of dissimilar data type" process. The rule storage algorithm involves concatenating all of the elements of the rule regardless of the type of each element and then hashing the resulting string to arrive at a hash value that is then used to insert the rule into the rule hash table.

At run time, the rule engine performs a different version of the "concatenate and hash" operation on the elements of the transaction. The rule engine concatenates selected elements of the transaction in a series of patterns or "combinations." For each combination, the rule engine selects a subset of the elements from the transaction, concatenates them regardless of type and then hashes them. It then uses the resulting hash to index into the hash table to determine if there is a matching rule. If there is no matching rule, the rule engine proceeds to the next combination which specifies a different subset of the elements in the transaction, extracts them from the transaction, hashes them and looks for a match in the hash table. This allows the rule engine to evaluate rules that are missing many elements. If the rule engine is in "black list" mode, if there is a match of a transaction to a rule the rule engine signals the user with an alert and may also block the transaction. Other rule actions are also possible, such as an ignore action. The ignore action tells the rule engine to not export any data records for this matched record. The combinations that drive this process are pre-defined using a binary selection process.

According to one aspect, rule elements that specify matching operations on transaction elements that are more complex than a simple perfect match are handled by deferring the complex operation to a "post processing" phase that occurs after the rest of the rule elements have been shown to match. According to another aspect, techniques are provided that maximize speed by eliminating consideration by the rule engine of combinations which are not needed by the presently loaded rule set. Also, the number of combinations that must be tested is further reduced by grouping the elements of a transaction into "families" of elements that relate to families of applications.

According to another aspect, the rule engine performs all of the combinations, concatenates, hashes, and compares them to the loaded rules in the hash table but if there is a match then no action it taken, but if there is not a match then the rule engine signals the user with an alert and may block the transaction. According to this aspect, the rule engine implements a "white list" functionality.

According to still another aspect, two copies of the rule engine are executed in series. One of the rule engines operates in black list mode and the other in white list mode. Each copy of the rule engine has its own rule stored and rule hash table but both operate on the same transaction. According to this aspect, both black list and white list rules can coexist at the same time and be applied to the same transaction stream.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 5 is a block diagram that illustrates the concept of concatenation of dissimilar data types as applied to the example transactions and rules from FIG. 4, in accordance with one embodiment of the present invention.

FIG. 8 is a block diagram that illustrates how rule combinations can be reduced by examination of loaded rules accordance with one embodiment of the present invention.

DETAILED DESCRIPTION

Figure 1:
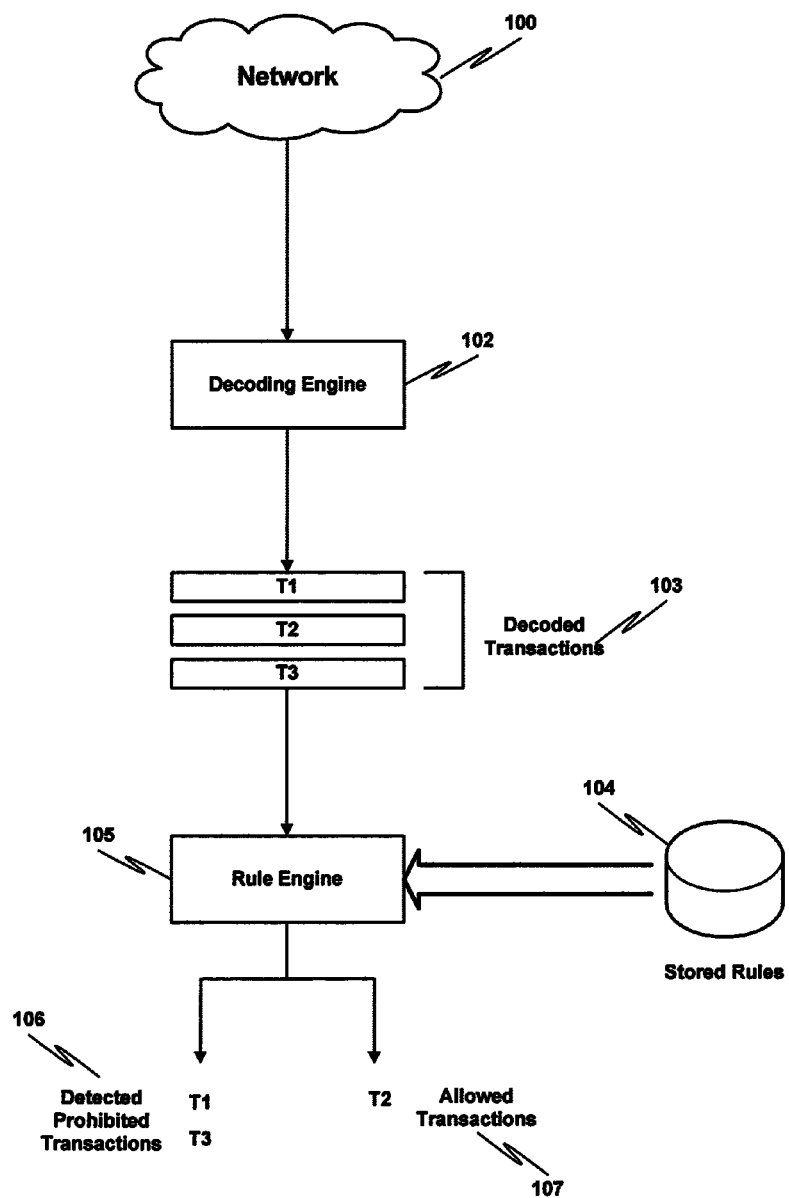
FIG. 1 is a block diagram that illustrates a system for rapid evaluation of numerically large complex rules governing network and application transactions in accordance with one embodiment of the present invention.

Embodiments of the present invention are described herein in the context of rapid evaluation of numerically large complex rules governing network and application transactions. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "distributed" describes a digital information system dispersed over multiple computers and not centralized at a single location.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

It should be noted that the computer system is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Example embodiments of the present invention provide a solution where a rule engine can examine a complex set of varied transactions that have elements of many different types and further can determine if a transaction matches all of the elements of all of the loaded rules. These operations can be completed in a bounded time period that is very short and which is not a function of the number of rules that are loaded.

FIG. 1 is a block diagram that illustrates a system for rapid evaluation of numerically large complex rules governing network and application transactions in accordance with one embodiment of the present invention. As shown in FIG. 1, rule engine 105 is configured to accept transaction records coming from network 100. These the transaction records are extracted from the network 100 by decoding engine 101. The decoding engine 101 breaks the transaction down into its key elements. Each transaction will have several fields or "elements" which specify the transaction. For example, if the transaction was a file delete transaction then the elements of the transaction would be the IP address of the user who performed the delete, the IP address of the host on which the file resided before it was deleted, the name of the file, the name of the path or "folder" in which the file resided before it was deleted, the fact that it was a delete operation and not, for example a copy, or read operation, and possibly an indication as to whether the file delete succeeded or failed, and perhaps the size of the file and its creation date and many other elements.

The transactions shown at 103 each contain the elements that characterize the transaction. These transactions arrive at the input to the rule engine 105 as they are generated by the Decode Engine. The rule engine 105 has access to a list of stored rules 104 which are transactions that the user of the system wants to prohibit. This list can be very long and very complex with many different cases specified and with elements omitted in some rules but not others.

Rule engine 105 is configured to compare each transaction as it arrives to all of the stored rules 104 and determine if that transaction violates any of those rules 104. If the transaction violates any of the rules 104, the rule engine 105 indicates that it has detected a violation 106 and an action is taken as specified in the rule itself, perhaps to block the transaction, ignore the transaction, or at least to send an alert to the user that a prohibited transaction has occurred. If the transaction is not found in the stored rules 104 then no action is taken (107).

Figure 2:
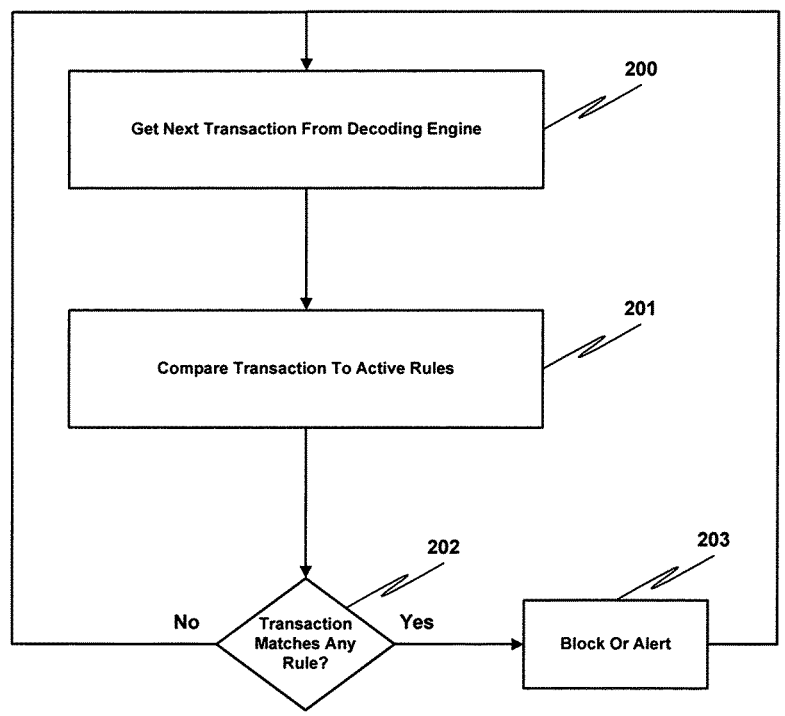
FIG. 2 is a flow diagram that illustrates a method for rapid evaluation of numerically large complex rules governing network and application transactions in accordance with one embodiment of the present invention.

FIG. 2 is a flow diagram that illustrates a method for rapid evaluation of numerically large complex rules governing network and application transactions in accordance with one embodiment of the present invention. The processes illustrated in FIG. 2 may be implemented in hardware, software, firmware, or a combination thereof. FIG. 2 shows a flow diagram of the high level operations that the rule engine must perform. The rule engine loops repeatedly by first getting the latest transaction and its elements 200, comparing the elements to the active stored rules 201 and determining if any of the rules match the transaction 202 and if it does, takes the appropriate action 203. It is the operations performed at 201 and 202 that is the most challenging for most rule engines. Methods for efficiently handling processes 201 and 202 in accordance with embodiments of the present invention are discussed below.

Figure 3:
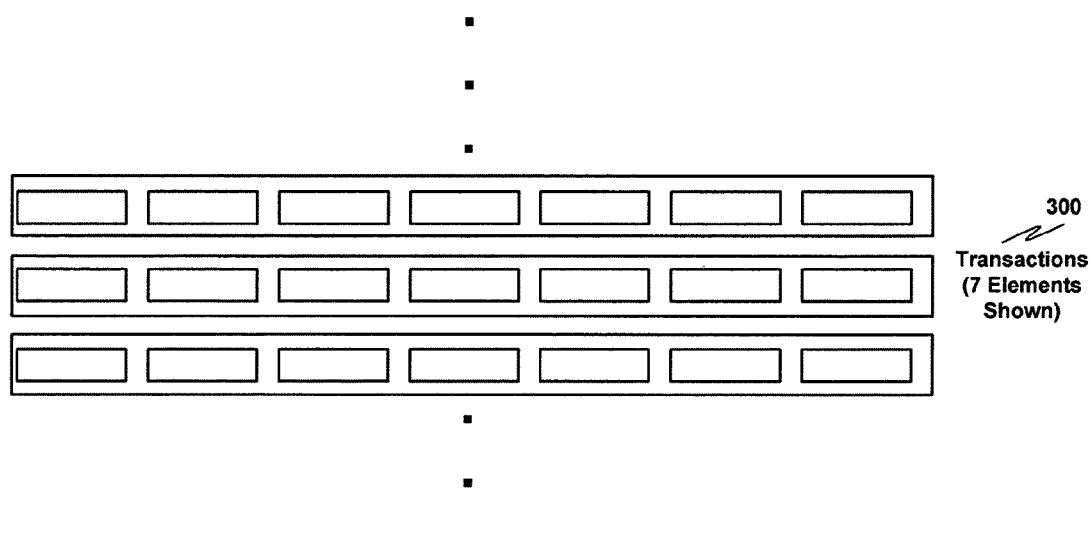
FIG. 3 is a block diagram that illustrates transactions consisting of multiple elements.

FIG. 3 is a block diagram that illustrates transactions consisting of multiple elements. FIG. 3 shows three transactions each with just seven elements 300. In the examples below, seven elements are used to illustrate embodiments of the present invention. Those skilled in the art will recognize the a different number of elements may be used.

Figure 4:
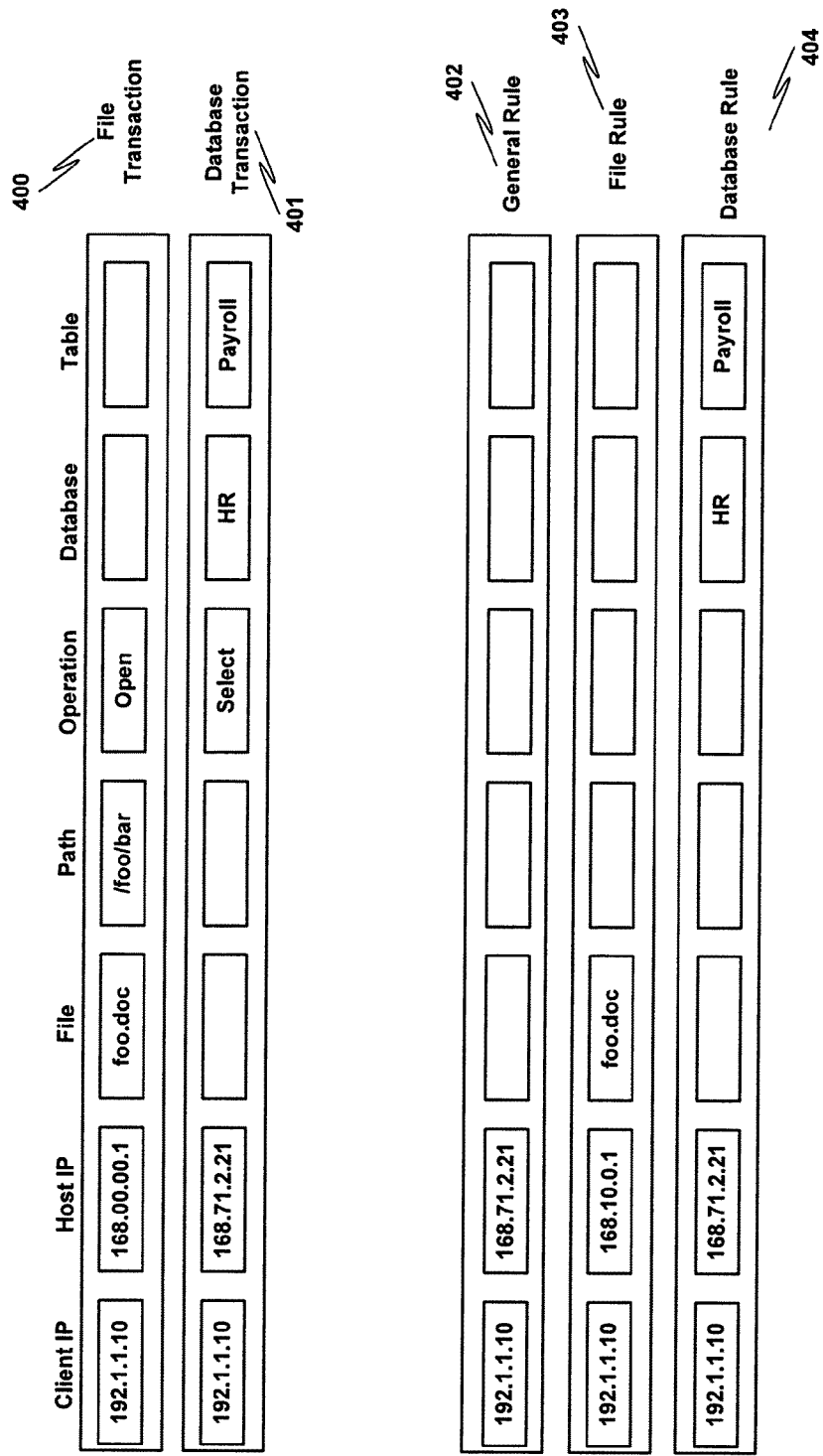
FIG. 4 is a block diagram that illustrates transactions with up to seven specific elements and rules with up to seven specific elements in accordance with one embodiment of the present invention.

FIG. 4 is a block diagram that illustrates transactions with up to seven specific elements and rules with up to seven specific elements in accordance with one embodiment of the present invention. FIG. 4 shows two transaction and three rules, each which specify one or more of the seven elements. The exact value of each element is specified. There is a "Client IP" which is the IP address of the client or user, "Host IP" which is the IP address of a server, "file" which is the file name (if the operation was on a file), "path" which is the file path or "folder" in which the file resides (if it is an operation on a file), "operation" which indicates what operation the user performed on the data, "database" which contains the database name if the operation was a database operation, and "table" which contains the database table name if the operation was a database operation.

As shown in FIG. 4, the first transaction 400 is a file transaction as the file elements are filled in. The second transaction 401 is a database transaction.

The three rules, 402, 403, and 404 do not specify every element possible. The first rule 402 specifies only the client (user) IP address and the host address. The effect of this rule is to prevent that user at client IP address 192.1.1.10 from performing any operation on the host having IP address 168.71.2.21. The second rule 403 we refer to as a "file rule," as it contains elements that specify at least one of the file attributes—in this case a filename "foo.doc". The rule 403 also specifies the client IP address and host IP address. It is the effect of this rule 403 to prohibit the user at that client IP address 192.1.1.10 from performing any operation on the file "foo.doc" that resides at the host having the IP address 168.10.0.1. The third rule 404 specifies elements that are specific to a database. This rule's effect is to prevent the user at client IP address 192.1.1.10 from performing any operation on the database table "payroll" contained within the database "HR" that resides on the host having IP address 168.71.2.21.

Users may want to selectively omit certain elements from rules. This has the effect of creating a wild card case for the empty element. This capability, while important to the user of the system, makes it extremely difficult to match transactions to rules particularly if there are many elements (more than 7) and numerous rules.

One way to match all of the transaction to the rules would be to compare each element of each transaction to each element of each rule. The amount of computational power required is directly proportional to the number of rules.

Embodiments of the present invention solve this problem and provide a bounded time to evaluate arriving transactions that does not increase as more rules are added to the rules store. And, according to embodiments of the present invention, rule analysis speed is not a function of the number of rules loaded and is effectively limited only by the amount of memory available which in modern computing systems is a very large amount.

According to one embodiment of the present invention, the rules are stored in a single hash table. The hash is created by concatenating all of the elements of the rule, and concatenating certain combinations of the elements of transactions. The concatenation operation is done regardless of the type of each element. Each element, be it an integer, IP address, fixed length string, variable length string, or an other is simply concatenated resulting in a sequence of numbers. This sequence is then hashed, e.g. using a CRC algorithm, and the resulting integer is used to create an index into a hash table.

When a rule is defined this operation—concatenation of dissimilar types followed by hashing—is performed on all of the elements in the rule. The resulting index is then used to record in the hash table that a rule exists at that point in the hash table. When a transaction arrives at the rule engine this concatenate and hash operation is repeated on the elements of the transaction and if the elements of the transaction exactly match the elements of the rule then the resulting integer will point to the same location in the hash table where the rule is stored and the rule engine will have determined that a transaction has matched. This operation is depicted in the flow diagram of FIG. 6.

FIG. 5 is a block diagram that illustrates the concept of concatenation of dissimilar data types as applied to the example transactions and rules from FIG. 4, in accordance with one embodiment of the present invention. FIG. 5 shows what the concatenated strings look like for the transactions and the rules specified in FIG. 4.

Figure 6:
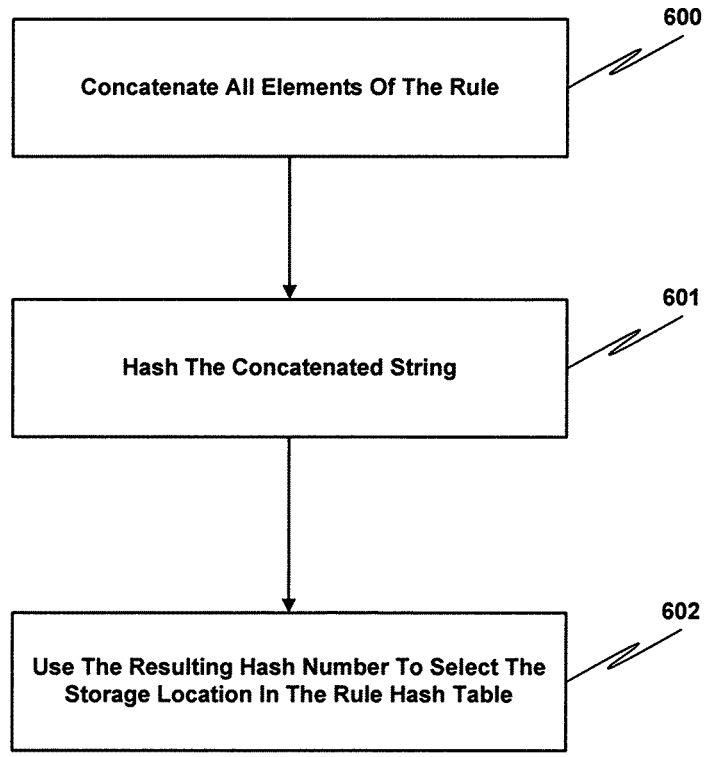
FIG. 6 is a flow diagram that illustrates a method for hashing rules and storing the rules in a hash table before the rule engine begins operation, in accordance with one embodiment of the present invention.

FIG. 6 is a flow diagram that illustrates a method for hashing rules and storing the rules in a hash table before the rule engine begins operation, in accordance with one embodiment of the present invention. The processes illustrated in FIG. 6 may be implemented in hardware, software, firmware, or a combination thereof. At 600, all elements of a rule are concatenated. At 601, a hash function is applied to the concatenated string, creating a hash number. At 602, the hash number is used to select a storage location in the rule hash table.

The approach described above does not address the case of "sparse" rules—that is rules that may specify only a few elements leaving some blank because the user wants to wildcard those elements. In order to adapt the "concatenate and hash" algorithm to this, it becomes necessary to consider all of the combinations of elements that a rule could specify. It might appear that one would have to consider all of the binary combinations of the elements that can appear in a rule—for example in a small rule system with just seven elements one might think it necessary to perform $2^7$—1 combinations, for a total of 127 combinations. Example embodiments of the present invention include several ways to dramatically reduce the number of such binary combinations.

Figure 7:
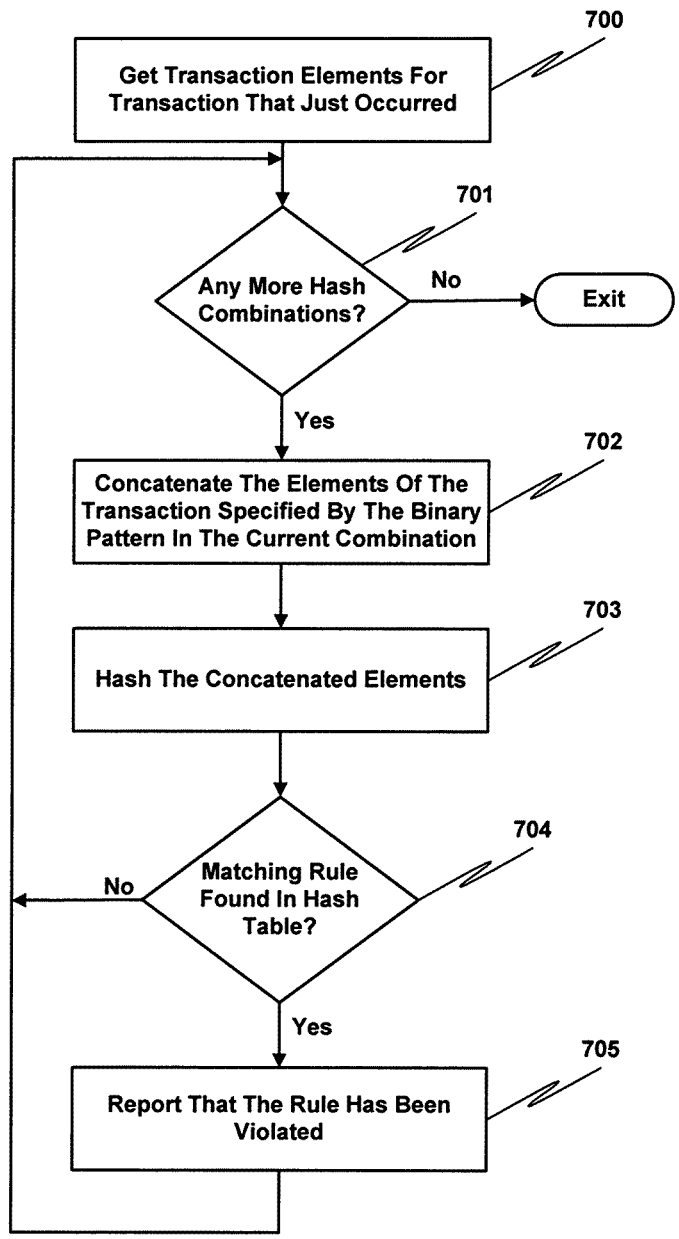
FIG. 7 is a flow diagram that illustrates operation of rule engine in accordance with one embodiment of the present invention.

Before considering the issue of reducing the number of combinations consider FIG. 7 which contains a simplified flow diagram of the rule engine main processing loop. FIG. 7 is a flow diagram that illustrates operation of rule engine in accordance with one embodiment of the present invention. The processes illustrated in FIG. 7 may be implemented in hardware, software, firmware, or a combination thereof. At 700, the rule engine to gets the transaction elements. Next the rule engine enters a loop in which it takes each of the combinations of the elements and performs the concatenate and hash operation to determine whether there is any rule that matches some or all of the elements in the transaction. At 701, the rule engine checks to see if has done the concatenate and hash operation for all of the combinations that are available. If the rule engine has not done the concatenate and hash operation for all of the combinations that are available, the rule engine takes the next binary pattern and selects just those elements from the input transaction elements that correspond to that binary pattern, concatenates them (702) and performs the hash operation (703). If a match is found in the hash table the rule engine reports that the transaction is prohibited (705) which may result in an alert, ignore or a blocking action. If the new hash is not found in the table, the loop repeats.

Embodiments of the present invention may employ variety of techniques to reduce the number of binary combinations that must be applied to the elements of a transaction. One technique is to take advantage of the fact that many of the elements can never appear in the same transaction. For example, using the simple seven element transaction structure used in FIG. 4, it is not possible for a single transaction to fill in both the fields that are designed for elements of the transaction specific to databases and to also have values in the fields that are used for file operations. Specifically, in FIG. 4 the "file" element and the "path" element will always be empty if either the "database" or the "table" elements are present. This significantly reduces the number of combinations that must be concatenated and hashed from the theoretical $2^N-1$, where N is the number of columns.

An additional way that the rule engine can reduce the number of combinations that is has to concatenate and hash is to examine the rules that are loaded and eliminate tests for elements that do not appear in any of the currently loaded rules. FIG. 8 shows a situation that illustrates this. FIG. 8 is a block diagram that illustrates how rule combinations can be reduced by examination of loaded rules accordance with one embodiment of the present invention. There are only two rules loaded in the rule engine, and they are the ones shown at the top of the figure. As can be seen, there are no rules that reference the "file" element, the "path" element, or the "database" element. As a result the rule engine can ignore those elements of a transaction and can skip performing the concatenate and hash operation on any binary combinations that include those elements and can focus on binary combinations using just the other 4 elements. This dramatically reduces the number of combinations that must be executed.

The preceding discussion considered exact matches between the elements of the transaction and the elements of the rules. However there are cases where users desire a more complex matching algorithm for an element. Two examples of this are covered in FIG. 9, which demonstrates the flexibility and versatility of embodiments of the present invention. The first two rules shown in FIG. 9 contain two operations that are more complex than a simple match of a rule element to a transaction element. The first rule at 900 contains a wild card on a portion of a file name. Rule 900 indicates the user wants the rule to match not a particular file name, but file names having an extension "xls" which means that they are Microsoft Excel files. Because the concatenate and hash algorithm looks for exact matches, it cannot handle this case directly.

According to one embodiment of the present invention, the rule is encoded as if the "file" attribute was empty as shown at 902. In this case, the rule is encoded as consisting of just the "clientIP" and "operation" fields and the "file" element of the rule has been removed. If a transaction matches these elements of the rule, then the rule will check the file element of the transaction to see if it matches the "*.xls" wild card condition. This is a very efficient way to handle this case as the computationally expensive calculation of checking the file name against the "*.xls" pattern is only performed if the rest of the elements of the transaction matched the other rule elements. This is referred to as "post processing."

Figure 9:
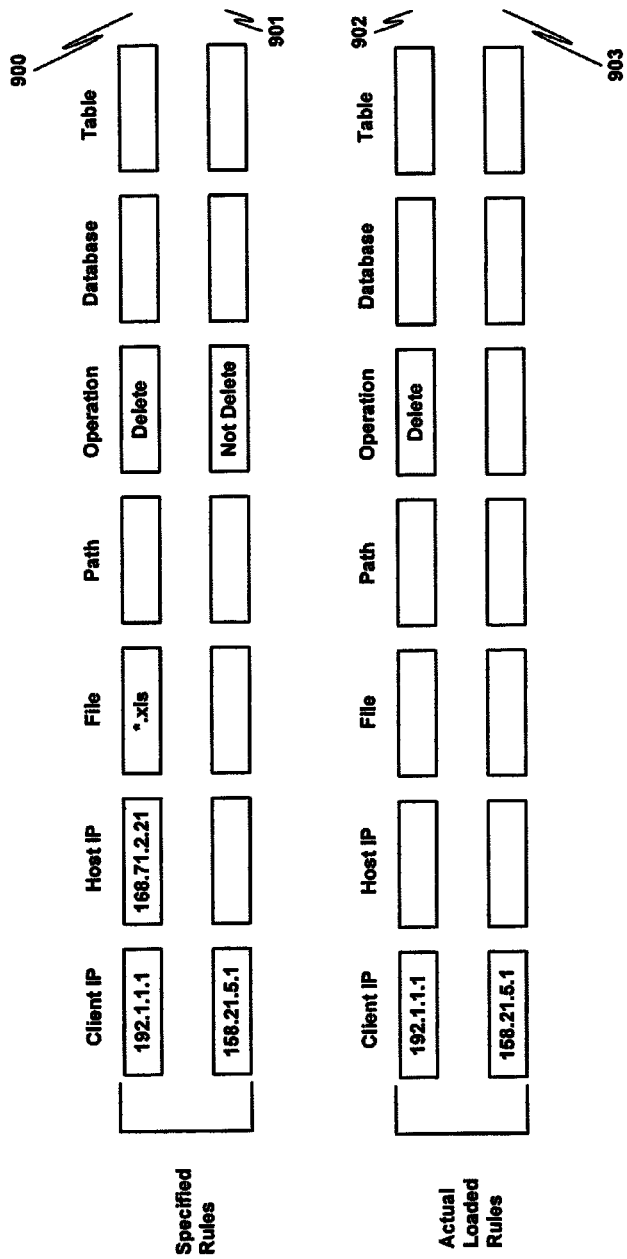
FIG. 9 is a block diagram that illustrates how complex conditions on certain rule elements are handled by reducing the specified elements in a rule and deferring the analysis of that complex condition—"post processing" it—and only post-processing it when all of the other elements of the rule match the elements of the transaction, in accordance with one embodiment of the present invention.

FIG. 9 also illustrates another aspect of the system in accordance with one embodiment of the present invention. The rule at 901 has a special condition in its "operation" element. The operation specifies "NOT delete." What the user wants to do with this rule is "white list" the person who has client IP address 158.21.5.1 so that they are only allowed to perform DELETE operations. Any other operation is prevented. According to one embodiment of the present invention, the NOT operator can be used on all the important elements of the rule providing a comprehensive "white list" function.

This aspect of the present invention may be implemented similar to the "wild card" operation discussed with respect to FIG. 9. Because the rule at 901 contains the NOT on the "operation" element, the rule is encoded with no "operation" element at all as in 903. If the other attributes of the rule fire—in this case any operation by a user with client IP 158.21.5.1—the rule will match. The rule will not report a violation however until it checks the value of the "operation" element of the transaction to see if it is "delete". If it is a "delete" the rule will not indicate a violation. If the operation is anything other than "delete" the rule will report a violation. As with the file wild card case above, this more expensive NOT calculation is only performed if the other elements of the rule all match the transaction.

Figure 10:
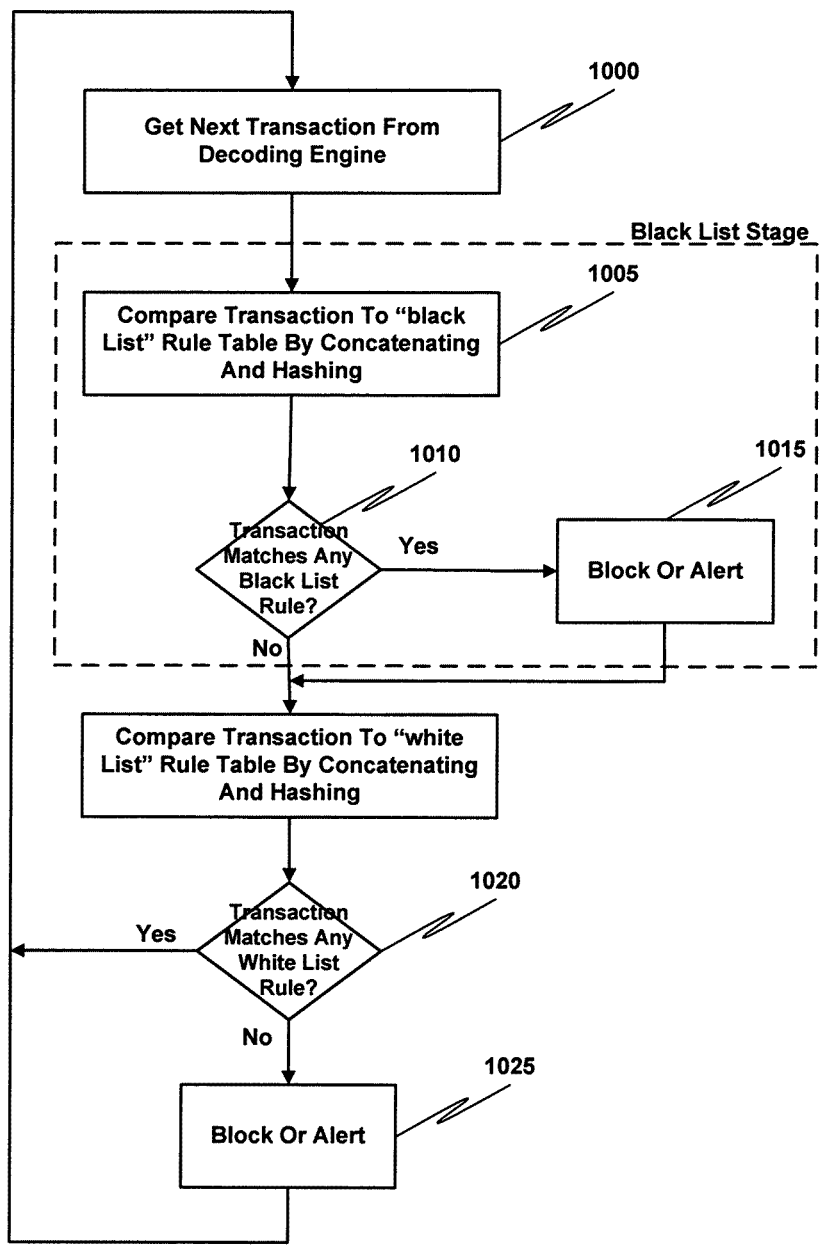
FIG. 10 is a flow diagram that illustrates deployment of a rule engine in both a "white list" and "black list" mode and both simultaneously, in accordance with one embodiment of the present invention.

FIG. 10 is a flow diagram that illustrates deployment of a rule engine in both a "white list" and "black list" mode and both simultaneously, in accordance with one embodiment of the present invention. The processes illustrated in FIG. 10 may be implemented in hardware, software, firmware, or a combination thereof. FIG. 10 illustrates that the entire black list rule engine can be inverted to provide a white list capability and the black list and white lists can co-exist. As shown in FIG. 10, the upper dashed-line box labeled "Black List Stage" is the same logic as described above with respect to FIG. 2—so it is the "black list" rule engine described herein. But also in the lower portion of FIG. 10 there appears a "white list" rule engine which runs in series after the black list engine. The only difference between the two is that the white list copy of the rule engine treats a rule match as an indication that it should do nothing—and if a rule fails to match it blocks the transaction or alerts. This is the opposite of the black list rule engine's logic which blocks when a rule matches. Embodiments of the present invention may operate in black list, white list mode, or both in series as shown in FIG. 10.

Figure 11:
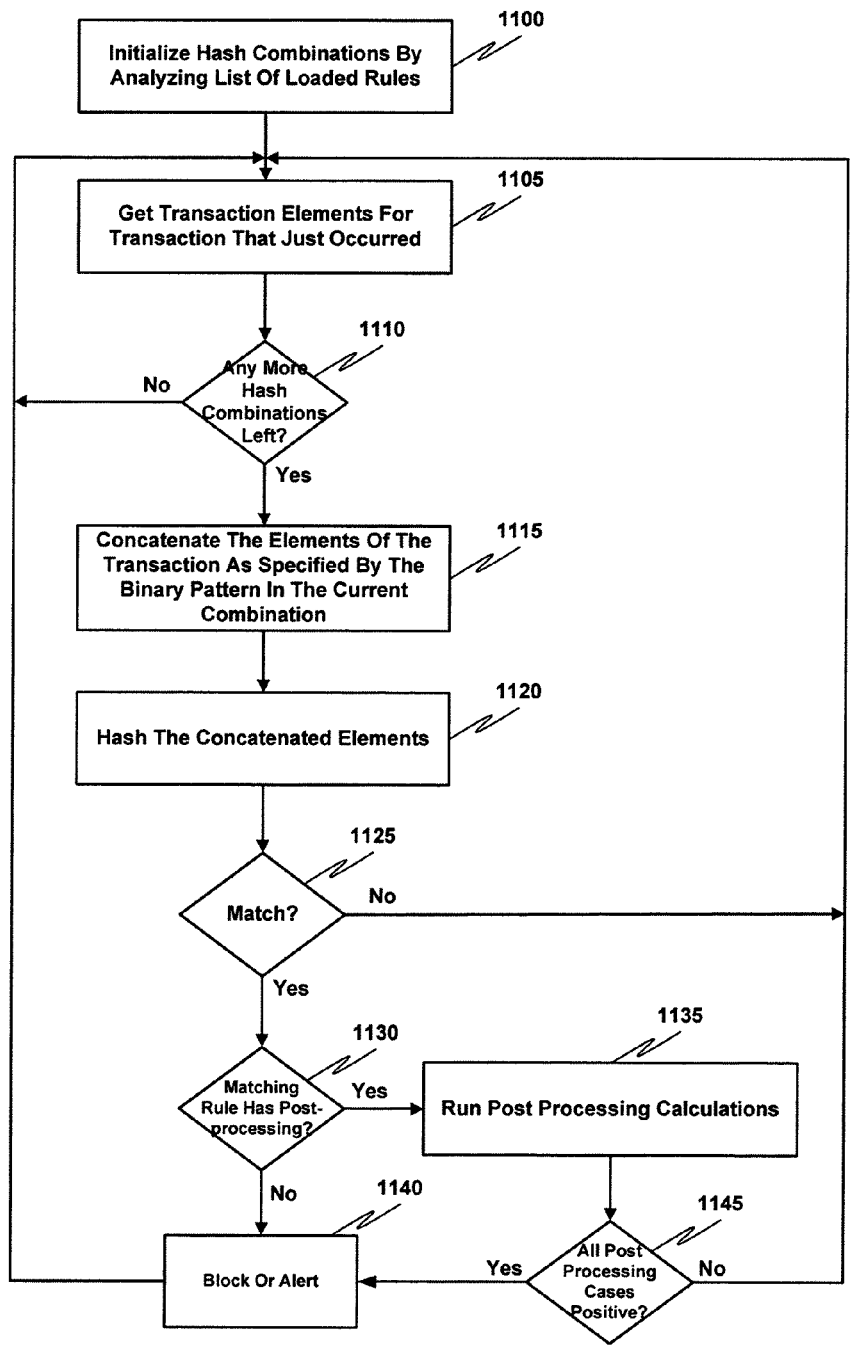
FIG. 11 is a flow diagram that illustrates detailed operation of a rule engine in accordance with one embodiment of the present invention.

FIG. 11 is a flow diagram that illustrates detailed operation of a rule engine in accordance with one embodiment of the present invention. The processes illustrated in FIG. 11 may be implemented in hardware, software, firmware, or a combination thereof. FIG. 11 contains a more detailed version of the rule engine logic discussed above with reference to FIG. 7. In FIG. 11, several of the concepts described in figures the initialization of the combinations based on the rules that are loaded to prevent unnecessary computation as taught in FIG. 8, and the post processing concepts taught in FIG. 9.

At 1100, hash combinations are initialized by analyzing a list of loaded rules. At 1105, transaction elements for a transaction that just occurred are obtained. At 1110, a determination is made regarding whether any more combinations remain. If more combinations remain, at 1115, the elements of the transaction are concatenated as specified by the binary pattern in the combination. At 1120, the concatenated elements are hashed to create a hash number. At 1125, a determination is made regarding whether there is a match. If there is a match, at 1130, a determination is made regarding whether the matching rule has post-processing. If the matching rule has post-processing, post processing calculations are executed at 1135. If at 1130 the matching rule has no post processing, a blocking action, an alert action, or an ignore action (NOT SHOWN) is performed at 1140. If at 1145 all post processing cases are positive, a blocking action or alert action is performed at 1140. If at 1145 not all post processing cases are positive, processing continues at 1105.

Although embodiments of the present invention have been illustrated using examples from file applications and database applications, embodiments of the invention may be applied to any application, including for example email applications, Chat applications, document management applications, TN3270 mainframe applications, and AS/400 5250 applications.

Figure 12:
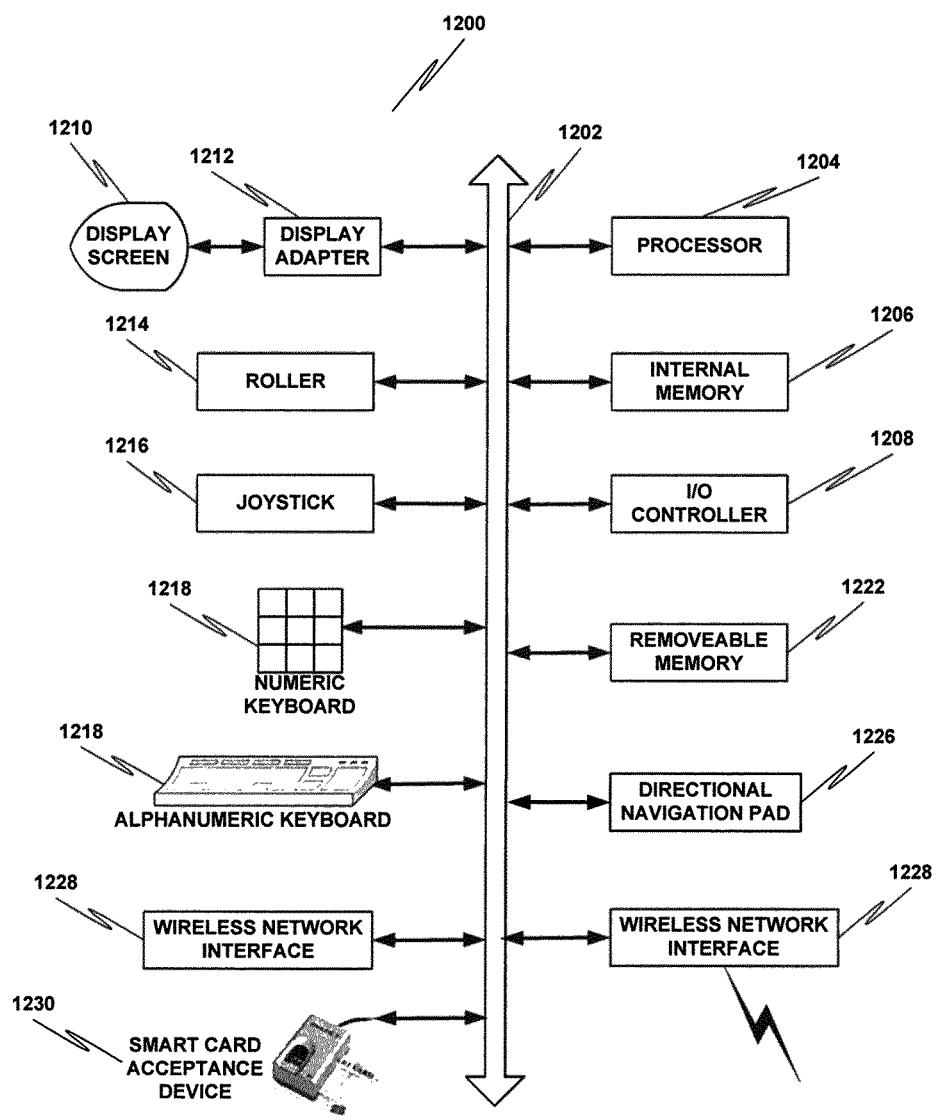
FIG. 12 is a block diagram of a computer system suitable for implementing aspects of the present invention.

FIG. 12 depicts a block diagram of a computer system 1200 suitable for implementing aspects of the present invention. As shown in FIG. 12, system 1200 includes a bus 1202 which interconnects major subsystems such as a processor 1204, an internal memory 1206 (such as a RAM), an input/output (I/O) controller 1208, a removable memory (such as a memory card) 1222, an external device such as a display screen 1210 via display adapter 1212, a roller-type input device 1214, a joystick 1216, a numeric keyboard 1218, an alphanumeric keyboard 1218, directional navigation pad 1226, smart card acceptance device 1230, and a wireless interface 1220. Many other devices can be connected. Wireless network interface 1220, wired network interface 1228, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 12 to be present to practice the present invention. Furthermore, the devices and subsystems may be interconnected in different ways from that shown in FIG. 12. Code to implement the present invention may be operably disposed in internal memory 1206 or stored on storage media such as removable memory 1222, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
    at a network device, receiving network transaction record comprising a plurality of elements of possibly dissimilar data types, each of the plurality of elements characterizing a network transaction;
    creating a hash of a result of concatenating the plurality of elements regardless of the type of each of the plurality of elements; and
    if the hash is found in a hash table comprising, for each network transaction rule, a hash of the plurality of elements comprising the rule,
        ignoring the network transaction;
        blocking the network transaction; or
        alerting a network user that a prohibited transaction has occurred.

2. The method of claim 1 wherein the creating further comprises, for each combination of elements in the network transaction record, creating a hash.

3. The method of claim 2 wherein a number of combinations of elements is reduced by eliminating combinations of elements that cannot be present in the same network transaction.

4. The method of claim 3 wherein the combinations of elements that cannot be present in the same network transaction comprise a combination of:
    elements of a transaction specific to database operations; and
    elements of a transaction specific to file operations.

5. The method of claim 2 wherein a number of combinations of elements is reduced by eliminating combinations of elements that include an element not found at least one rule.

6. The method of claim 1, further comprising:
    for each network transaction rule having a wild card for a portion of at least one of the plurality of elements comprising the rule, the hash is encoded as if the elements having a wild card were absent from the rule;
    if the hash is found, matching the network transaction against the element having the wild card; and
    if there is a match,
        ignoring the network transaction;
        blocking the network transaction; or
        alerting a network user that a prohibited transaction has occurred.

7. The method of claim 1, further comprising:
    for each network transaction rule having a white list indication for a portion of at least one of the plurality of elements comprising the rule, the hash is encoded as if the elements having a wild card were absent from the rule;
    if the hash is found, matching the network transaction against the element having the white list element; and
    if there is no match,
        ignoring the network transaction;

blocking the network transaction; or
alerting a network user that a prohibited transaction has occurred.

8. A network device comprising:
a memory; and
one or more processors configured to:
receive network transaction record comprising a plurality of elements of possibly dissimilar data types, each of the plurality of elements characterizing a network transaction;
create a hash of a result of concatenating the plurality of elements regardless of the type of each of the plurality of elements; and
if the hash is found in a hash table comprising, for each network transaction rule, a hash of the plurality of elements comprising the rule,
ignore the network transaction;
block the network transaction; or
alert a network user that a prohibited transaction has occurred.

9. The network device of claim 8 wherein the creating further comprises, for each combination of elements in the network transaction record, creating a hash.

10. The network device of claim 9 wherein a number of combinations of elements is reduced by eliminating combinations of elements that cannot be present in the same network transaction.

11. The network device of claim 10 wherein the combinations of elements that cannot be present in the same network transaction comprise a combination of:
elements of a transaction specific to database operations; and
elements of a transaction specific to file operations.

12. The network device of claim 9 wherein a number of combinations of elements is reduced by eliminating combinations of elements that include an element not found at least one rule.

13. The network device of claim 8 wherein the one or more processors are further configured to:
for each network transaction rule having a wild card for a portion of at least one of the plurality of elements comprising the rule, encode the hash as if the elements having a wild card were absent from the rule;
if the hash is found, match the network transaction against the element having the wild card; and
if there is a match,
ignore the network transaction;
block the network transaction; or
alert a network user that a prohibited transaction has occurred.

14. The network device of claim 8 wherein the one or more processors are further configured to:
for each network transaction rule having a white list indication for a portion of at least one of the plurality of elements comprising the rule, encode the hash as if the elements having a wild card were absent from the rule;
if the hash is found, match the network transaction against the element having the white list element; and
if there is no match,
ignore the network transaction;
block the network transaction; or
alert a network user that a prohibited transaction has occurred.

15. A program storage device readable by a machine, embodying a program of instructions executable by the machine to perform a method, the method comprising:

at a network device, receiving network transaction record comprising a plurality of elements of possibly dissimilar data types, each of the plurality of elements characterizing a network transaction;
creating a hash of a result of concatenating the plurality of elements regardless of the type of each of the plurality of elements; and
if the hash is found in a hash table comprising, for each network transaction rule, a hash of the plurality of elements comprising the rule,
ignoring the network transaction;
blocking the network transaction; or
alerting a network user that a prohibited transaction has occurred.

16. A network device comprising:
means for, at a network device, receiving network transaction record comprising a plurality of elements of possibly dissimilar data types, each of the plurality of elements characterizing a network transaction;
means for creating a hash of a result of concatenating the plurality of elements regardless of the type of each of the plurality of elements; and
means for, if the hash is found in a hash table comprising, for each network transaction rule,
a hash of the plurality of elements comprising the rule,
ignoring the network transaction;
blocking the network transaction; or
alerting a network user that a prohibited transaction has occurred.

17. A computer implemented method comprising:
at a network device, receiving network transaction record comprising a first plurality of elements of possibly dissimilar data types, each of the first plurality of elements characterizing a network transaction;
selectively removing one or more elements from the first plurality of elements according to a binary pattern to create a second plurality of elements;
creating a hash of a result of concatenating the second plurality of elements regardless of the type of each of the plurality of elements; and
if the hash is found in a hash table comprising, for each network transaction rule, a hash of a plurality of elements comprising the rule,
ignoring the network transaction;
blocking the network transaction; or
alerting a network user that a prohibited transaction has occurred.

18. A network device comprising:
a memory; and
one or more processors configured to:
receive network transaction record comprising a first plurality of elements of possibly dissimilar data types, each of the first plurality of elements characterizing a network transaction;
selectively remove one or more elements from the first plurality of elements according to a binary pattern to create a second plurality of elements;
create a hash of a result of concatenating the second plurality of elements regardless of the type of each of the plurality of elements; and
if the hash is found in a hash table comprising, for each network transaction rule, a hash of a plurality of elements comprising the rule,
ignoring the network transaction;
block the network transaction; or alert a network user that a prohibited transaction has occurred.

* * * * *